July 30, 1963  J. W. McCOLLUM  3,099,121
ROTARY BEATER WITH SUCTION FLAILS
Filed June 12, 1961

*INVENTOR.*
JACK W. McCOLLUM
BY
Roger C. Johnson
*ATTORNEY*

United States Patent Office 3,099,121
Patented July 30, 1963

3,099,121
ROTARY BEATER WITH SUCTION FLAILS
Jack W. McCollum, Boise, Idaho, assignor of one-half to Deere & Company, Moline, Ill., a corporation of Delaware
Filed June 12, 1961, Ser. No. 116,373
4 Claims. (Cl. 56—121.44)

This invention relates generally to agricultural machines and more particularly to plant disintegrating implements, such as those particularly designed for shredding or disintegrating potato vines, beet tops, and the like.

The object and general nature of this invention is a provision of a rotary beater having new and improved flails particularly arranged to not only cut or sever the plant but also to beat or shred them by impact action. More particularly, it is a feature of this invention to provide beater flails, each having a curved portion acting to create a certain amount of suction that tends to lift the tops or plant material to be severed and disintegrated, whereby such material is more thoroughly acted upon by the cutting and beating means.

These and other objects and advantages of the present invention will be apparent to those skilled in the art after a consideration of the following detailed description, taken in conjunction with the accompanying drawings, in which.

Figure 1:
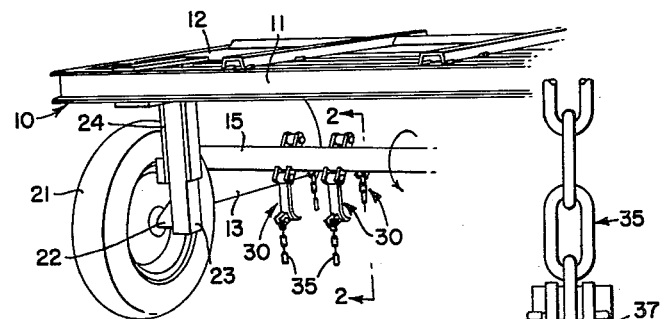
FIG. 1 is a fragmentary perspective view of a rotary beater in which the principles of this invention have been incorporated.
Figure 2:
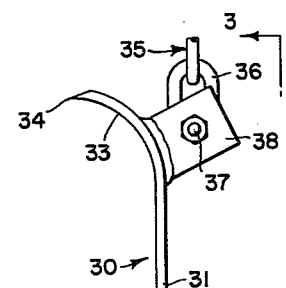
FIG. 2 is an enlarged sectional view taken generally along the line 2—2 of FIG. 1, showing two of the flails in the positions they occupy when the beater unit is rotated, the wheels and associated framework of the implement not being illustrated.
Figure 3:
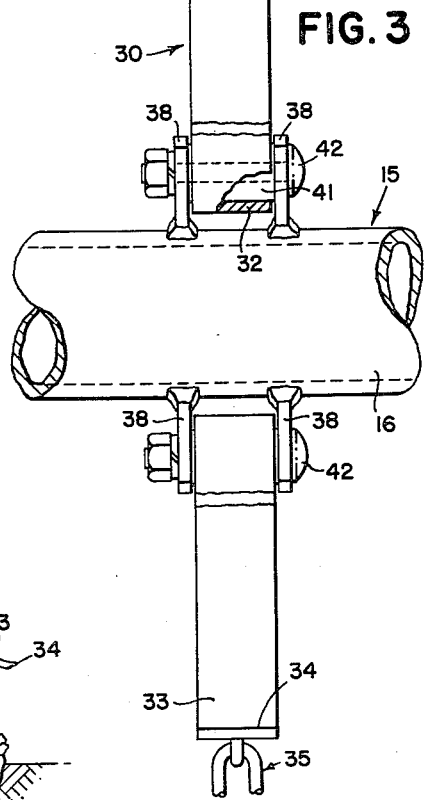
FIG. 3 is a view taken generally along the line 3—3 of FIG. 2.

Referring first to FIG. 1, the implement in which the present invention is incorporated is shown as including a main frame 10 that comprises transverse and fore-and-aft extending frame members indicated at 11 and 12 and side members or plates 13, two of the latter being provided but only one being shown in FIG. 1. The two side members 13 support a rotary shaft 15, preferably in the form of a pipe member 16 (FIGS. 2 and 3). The frame 10 is adapted to be drawn by any suitable means and the shaft 15 may be rotated in any suitable way. The frame 10 is supported upon a pair of ground wheels 21, only one of which is illustrated, each supported by stub axle means 22 fixed to the lower end of a generally vertical standard 23 that is vertically shiftable in a suitable support 24 carried by the frame 10. The latter may be raised and lowered relative to the ground wheel 21 by any suitable means.

A plurality of flail elements 30 are carried by the rotatable shaft 15 and generally such elements are disposed in generally diametrical opposite arrangement as shown in FIGS. 2 and 3. Each of the flail elements 30 includes a cutter bar 31 and carrying at its inner end a sleeve section 32 and at its outer end a curved portion 33 terminating in a cutting edge 34 that faces generally in the direction of movement of the flail element when the shaft 15 is driven. Each flail element also includes a flexible beater section 35, preferably in the form of a length of chain having its inner link 36 connected by a bolt 37 to a pair of apertured lugs 38 that are fixed, as by welding, to the rear face of the curved section 33.

A bushing 41 is disposed in each of the sleeve sections 32, being slightly longer than the sleeve section so that the ends of each bushing 41 fits snugly between apertured lugs 43. Each bushing 41 is held fixedly in place between the lugs 43 by suitable bolt means 42, so that when the latter is tightened, the bushings are rigidly clamped in position, the sleeve portions 32 being swingable or rockable on the associated bushing 41.

Figure 4:
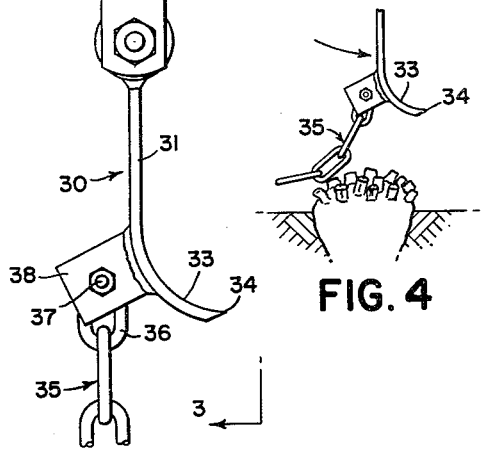
FIG. 4 is a fragmentary side view showing the action of the flail units when severing and pulverizing sugar beet tops.

In operation, when the shaft 15 is not driven, the flail elements 30 hang loosely, as illustrated in FIG. 1, but when the shaft 15 is rotated, the flail elements swing generally radially outwardly substantially to the positions shown in the FIGS. 2 and 3 for severing, pulverizing, or disintegrating plant material, the frame being lowered on the wheels 21 to the position whereby the cutting edges 34 and the flexible chain lengths 35 strike the plant growth to be destroyed. For example, as illustrated in FIG. 4, the cutting edges 34 of the several flails sever the tops as the curved portions 33 of the flail bars 31 act to create a certain amount of suction to tend to lift the plant growth upwardly from the ground. It will be seen from FIG. 4 that the chain lengths 35 strike the top stubs projecting from the beet crowns, thus disintegrating the stubs and any associated top growth. Thus, the chain lengths 35 serve as impact elements striking the plant material close to the ground and thoroughly pulverizing and shredding the same.

While I have shown and described above the preferred structure in which the principles of my invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A rotary beater for disintegrating the tops of row crop plants and other plant material, comprising a rotatable shaft disposed generally transversely relative to the direction of forward travel, and a plurality of plant-cutting and disintegrating flails swingably connected with said shaft and adapted to extend generally radially outwardly therefrom when said shaft is rotated, each of said flails comprising a bar having inner and outer end portions, the inner end portion being pivoted to said shaft, and the outer end portion of the bar being curved and sharpened to present a cutting edge facing generally in the direction of rotation of said shaft and bar, and a flexible beater element swingably connected with the back of the curved portion of said bar and extending generally radially outwardly of said shaft beyond said bar.

2. The invention set forth in claim 1, further characterized by said shaft carrying one or more pairs of apertured lugs fixed to said shaft in axially spaced apart relation, said flail bar comprising a flat member having a connecting sleeve at said one end, a bushing disposed in said sleeve and between a pair of said apertured lugs, and an attaching bolt extending through said bushing for fixing the latter to said lugs.

3. An apparatus for cutting and disintegrating the tops of row crop plants and other plant material, said apparatus comprising: a rotatable shaft disposed generally transversely relative to the direction of forward travel, means to rotate said shaft in a predetermined direction, cutting and disintegrating means carried by said shaft, said cutting and disintegrating means including a plate-like element having inner and outer ends, said outer end being provided with a curved portion terminating in a cutting edge facing generally in said direction of rotation, said inner end being pivotally secured to said shaft, and a flexible beater element having radially inner and outer end portions, said inner portion being connected to said plate-like element and the outer end portion extending radially outwardly of said cutting edge, the parts being so arranged and constructed that during rotation of said shaft the curved portion of the plate-like element will act to create a certain amount of suction to tend to lift plant growth, the cutting edge will sever the top portion of the plant growth, and the flexible beater element will strike the plant material close to the ground to disintegrate the same.

4. A flail adapted to be secured to a generally transversely disposed rotatable shaft, said flail comprising a plate-like element having inner and outer ends and rearward and forward faces, said outer end being provided with a forwardly extended curved portion terminating in a generally transversely disposed cutting edge, and a flexible beater secured at one end thereof to the rearward face of the curved portion of said plate-like element, the inner end of said plate-like element being adapted to be connected to said rotatable shaft.

References Cited in the file of this patent
UNITED STATES PATENTS

| | | |
|---|---|---|
| 2,608,816 | Lembke | Sept. 2, 1952 |
| 2,691,262 | Swertfeger | Oct. 12, 1954 |
| 2,938,326 | Lundell | May 31, 1960 |
| 2,987,868 | Cunningham | June 13, 1961 |